United States Patent [19]

Calahan et al.

[11] Patent Number: 4,633,372
[45] Date of Patent: Dec. 30, 1986

[54] POLYOXOMETALATE-MODIFIED CARBON ELECTRODES AND USES THEREFOR IN CAPACITORS

[75] Inventors: James L. Calahan, Norwich, N.Y.; Edward A. Cuellar, Shaker Heights, Ohio; Michael J. Desmond, Cleveland Heights, Ohio; John C. Currie, Novelty, Ohio

[73] Assignee: The Standard Oil Company, Cleveland, Ohio

[21] Appl. No.: 769,925

[22] Filed: Aug. 26, 1985

[51] Int. Cl.$^4$ .................. H01G 9/00; C25B 11/14
[52] U.S. Cl. .................. 361/433; 204/290 R; 204/294; 361/305; 429/218
[58] Field of Search .......... 204/290 R, 294; 361/305, 433 A; 429/218

[56] References Cited

U.S. PATENT DOCUMENTS

| | | | |
|---|---|---|---|
| 3,335,345 | 8/1967 | Diefendorf | 361/305 |
| 3,536,963 | 10/1970 | Boos | 361/433 A |
| 3,648,126 | 3/1972 | Boos et al. | 361/433 A |
| 3,804,740 | 4/1974 | Welch | 204/294 |
| 4,024,036 | 5/1977 | Nakamura et al. | 204/295 |
| 4,173,518 | 11/1979 | Yamada et al. | 204/290 R |
| 4,396,687 | 8/1983 | Kummer et al. | 429/19 |
| 4,407,902 | 10/1983 | Kummer et al. | 429/15 |
| 4,542,442 | 9/1985 | Boland | 361/433 A |

FOREIGN PATENT DOCUMENTS 0060818  4/1984  Japan .................. 204/294

OTHER PUBLICATIONS

Tell, "Electrochromism in Solid Phosphotungstic Acid," Journal of the Electrochemical Society, Nov. 1980, vol. 127, pp. 2451-2454.
Kodama et al., "Application of Heteropoly Acids to Solid Electrolytes," JEC Press, Inc., 1980, pp. 38-39.
Pope, "Heteropoly and Isopoly Oxometalates," Springer-Verlag, New York City, New York, 1983, pp. 101-117.
Gabano, "Lithium Batteries," Academic Press, Ch. 14, New York, 1983.

Primary Examiner—Terryence Chapman
Attorney, Agent, or Firm—Sue E. McKinney; Joseph G. Curatolo; Larry W. Evans

[57] ABSTRACT

Improved activated carbon electrodes are disclosed, which electrodes have increased charge storage capacity. Such improved electrodes are incorporated into energy storage devices such as electrical double layer capacitors. The improved charge storage capacity is due to the adsorption of polyoxometalate compounds into the activated carbon, which compounds are capable of reversible redox reactions and so provide a secondary charge storage mechanism without decreasing the charge storage ability of the activated carbon.

25 Claims, 1 Drawing Figure

POLYOXOMETALATE-MODIFIED CARBON ELECTRODES AND USES THEREFOR IN CAPACITORS

FIELD OF THE INVENTION

The present invention relates to the modification of carbon-based electrodes with polyoxometalate compounds. The modified electrodes possess greater charge storage density as the polyoxometalate does not detract from the charge storage function of the carbon electrode, but does store charge through a secondary reaction mechanism.

BACKGROUND OF THE INVENTION

Energy generation and storage has long been a subject of study and development. Of special importance is the storage of energy in a compact portable system that can be easily charged and discharged, such as rechargeable batteries and capacitors. Individual components of such systems have been individually investigated and optimized generally by seeking to achieve a maximum stored energy density. However, most commercially exploited systems yield far less than their theoretical energy density.

One such energy storage system utilizes activated carbon electrodes to store ions therein, which upon discharge release the ions to generate an electrical current. An example of an activated carbon electrode system is the electric double layer capacitor system described in U.S. Pat. No. 3,536,963 to Boos. The mechanism for energy storage is based on the formation of an electrical double layer at the interface between an activated carbon electrode and a supporting electrolyte under an applied electric field. These devices will accept and store significant amounts of energy at any available potential over which the device is stable, unlike batteries where a given threshold voltage must be exceeded. Optimization of this system is based on the optimization of the charge storage capacity of the activated carbon electrode used therein. It has been found that the capacity of such an electric double-layer capacitor can amount to several tens of farads per gram of activated carbon when the activated carbon has a surface area in excess of 1000 m$^2$/g.

Other forms of energy storage also have been separately developed, such as chemical energy storage, wherein the energy is stored and/or released through coupled chemical reactions involving the exchange of electrons. Polyoxometalates species are known to sustain reversible, multiple electron transfer. See, for example, "Heteropoly and Isopoly Oxometalates", M. J. Pope, Springer-Verlag, New York City, N.Y. 1983.

Kummer et al. disclosed chemically regenerable redox fuel cells wherein the oxidant is oxygen and the fuel is hydrogen in U.S. Pat. Nos. 4,396,687 and 4,407,902. The fuel cells utilized anolyte and catholyte solutions, the catholyte solution containing a heteropoly acid catalyst for the regeneration of the catholyte in the presence of oxygen, and the anolyte solution containing a heteropoly acid as the active component.

Kodama and Nakamura disclosed the use of a heteropoly acid complex, $H_3PMo_{12}O_{40}$ as a proton conducting solid electrolyte in a hydrogen/oxygen fuel cell, "Applications of Solid Electrolytes", T. Takahashi and A. Kozawa, Editors, pp. 38-39, JEC Press, Cleveland, Ohio, 1980.

Tell investigated the heteropolyanion complex $H_3PW_{12}O_{40}$ as a solid electrolyte in an electrochromic display comprising $SnO_2/H_3PW_{12}O_{40}$/graphite, "Electrochromism in Solid Phosphotungstinic Acid", Journal of the Electrochemical Society, Vol. 127, p. 2451, 1980.

Metal oxides, such as the polyoxometalate $V_6O_{13}$ have been used as positive electrode materials of rechargeable lithium cells, Abraham and Brummen, "Lithium Batteries", J. P. Gabano, Ed.; Academic Press, Ch. 14; New York, 1983. These oxides typically have extended lattice structures which undergo insertion on reduction.

In view of the above remarks, it is apparent that what is lacking in the field of activated carbon electrodes is an electrode having increased charge storage capacity to enable the further miniaturization of devices utilizing such electrode and/or to enable greater charge storage capacities in such devices.

It is therefore one object of the present invention to provide a modified activated carbon electrode having a relatively greater charge storage capacity.

It is a further object of the present invention to provide energy storage devices utilizing a modified activated carbon electrode having a relatively greater charge storage capacity.

It is yet another object of the present invention to provide an electric double layer capacitor incorporating modified activated carbon electrodes.

These and other objects of the present invention will become apparent to those skilled in the art from the below description of the invention.

SUMMARY OF THE INVENTION

The present invention is related to an improved carbon-based electrode comprising an activated carbon electrode having a polyoxometalate compound absorbed therein.

The present invention also relates to an energy storage device comprising a pair of electrodes electrically isolated from each other, an electrolyte in contact with the electrodes, and means for collecting electrical current therefrom; at least one electrode comprising an activated carbon electrode having a polyoxometalate compound absorbed therein.

Further, the present invention relates to an electric double layer capacitor comprising a housing, at least one pair of spaced activated carbon electrodes in the housing, an electrolyte in contact with the electrodes, and an ionically conductive separator interposed between the electrodes and in contact therewith, the electrodes comprising activated carbon having a polyoxometalate compound absorbed therein.

DETAILED DESCRIPTION OF THE INVENTION

In accordance with the present invention there is disclosed an improved, activated carbon electrode having a polyoxometalate compound absorbed therein.

Polyoxometalate compounds can be represented by the formula:

wherein
A is at least one ion selected from the group consisting of hydrogen, the Group I-A to VIII-A or I-B to VII-B elements, the rare earths or actinides, ammonium, alkyl ammonium, alkyl phosphonium and alkyl arsonium;

L is at least one element selected from the group consisting of hydrogen and Group III-B to VII-B elements;

M is at least one metal selected from the group consisting of Group I-A to IV-A metals, Group VII-A to II-B metals, the rare earths and actinides; and J is at least one metal selected from the group consisting of Group V-A metals and Group VI-A metals; and wherein a is a number which when multiplied by the valence of A will balance the charge on the polyoxometalate complex within the brackets;

l is a number ranging from zero to about 20;

m is a number ranging from zero to about 20;

z is a number ranging from about 1 to about 50; and y is a number ranging from about 7 to about 150.

Preferably L is at least one element of the group P, As, Si, Al, H, Ge, Ga and B; M is at least one element of the group Zn, Ti, Mn, Fe, Co, Ni, Rh, Zr and Re; and J is at least one metal of the group Mo, W and V. Preferably l ranges from zero to about 4; m ranges from zero to about 6; z ranges from about 6 to about 24; and y ranges from about 18 to about 80.

The species described above comprising $JO_6$ octahedra are referred to as isopolyoxometalates. Other elements can be incorporated to limited extents into the metal oxide lattice structure, resulting in species recognized as heteropolyoxometalates. Many of the isopolyoxometalate and heteropolyoxometalate complexes are capable of sustaining reversible redox reactions; being able to transfer or accept from one to more than thrity-two electrons in several well-defined steps over a wide voltage range of from about 1.0 volt to about −2.5 volts vs. a Ag/AgCl reference electrode.

Examples of polyoxometalate compounds include, but are not limited to hexametalate anions $[M_mJ_{6-m}O_y]$, the Keggin anions $[L_{1 \ or \ 2}M_mJ_{12-m}O_y]$ and the Dawson anions $[L_{2 \ to \ 4}M_mJ_{18-m}O_y]$.

A specific example of a heteropolyoxometalate is the compound $H_3PW_{12}O_{40}$ which exhibits a typical molecular structure of a Keggin anion.

Other examples of heteropolyoxometalates having the same structure include $H_4SiW_{12}O_{40}$, $H_3P \ Mo_{12}O_{40}$, $H_5P \ Mo_{10}V_2O_{40}$ and $H_4P \ Mo_{11}VO_{40}$. It is understood that these examples are merely illustrative of heteropolyoxometalates and not intended to be limitative of the class of heteropolyoxometalates.

Activated carbon electrodes utilized in energy storage devices generally have BET surface areas of from about 100 $m^2/g$ to about 2000 $m^2/g$, and preferably have BET surface areas of from about 500 $m^2/g$ to about 1500 $m^2/g$. The surface area of activated carbon is mostly internal and can be produced in most naturally occurring carbonaceous materials by known activation methods. It has been found that the ability of an activated carbon electrode to store energy is generally proportional to its surface area, although the carbon source, method of activation and additional processing treatments can also significantly affect the properties of activated carbons.

As described herein, a polyoxometalate compound is absorbed into activated carbon to significantly improve the charge storage capacity of a device which incorporates the modified carbon as an electrode therein. Polyoxometalate species capable of undergoing reversible, multiple electron reduction-oxidation steps over the range of potentials applied to the energy storage device exhibit an electrochemical response resembling the charging of the activated carbon electrode. This combination leads to devices having enhanced charge storage capabilities with discharge curve characteristics similar to a like device using an unmodified activated carbon electrode.

The polyoxometalate can be absorbed into the activated carbon electrode by known procedures such as vacuum/impregnation and soaking procedures. The polyoxometalate is absorbed into the activated carbon up to about forty weight percent, based on the total weight of the modified carbon. Preferably the polyoxometalate comprises from about five to about twenty-five weight percent of the modified carbon.

The polyoxometalate-modified activated carbon can be used as an electrode in an energy storage device and exhibits greater charge storage capacity than a similar device incorporating an unmodified activated carbon electrode. In the discussion that follows, reference will be made to the utilization of polyoxometalate-modified activated carbon electrodes in an electric double layer capacitor as described in U.S. Pat. No. 3,536,963 to Boos, but it is understood that the advantages due to the improved electrode of the present invention are similarly realized in other energy storage devices that may use activated carbon electrodes.

BRIEF DESCRIPTION OF THE DRAWINGS

The invention will be more clearly understood with reference to the following figure wherein.

DETAILED DESCRIPTION OF THE DRAWING

Figure 1:
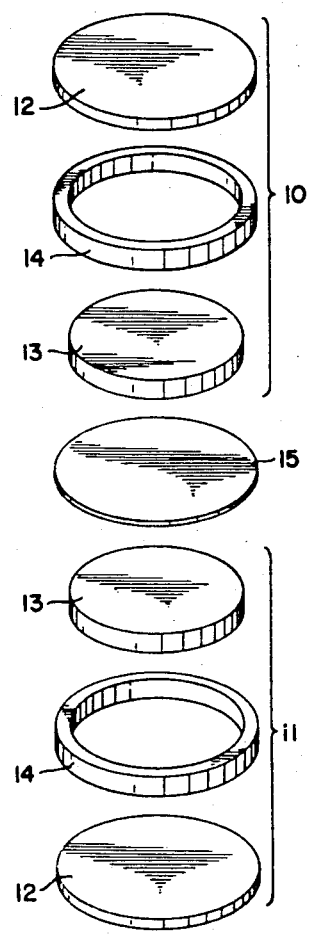
FIG. 1 is an exploded view of the components of a single cell electric double layer capacitor.

Referring now to the drawing, FIG. 1 depicts a double layer capacitor comprising a pair of identical electrode assemblies 10, 11. Each electrode subassembly includes an electrically conducting and ionically insulating member 12 which can be made of carbon, lead, iron, nickel, tantalum, conductive butyl rubber or any impervious conducting material. Member 12 is characterized by its electrical conducting property and its chemical inertness to the particular electrolyte employed at the potential impressed upon it. Its primary functions are as a current collector and an inter-cell ionic insulator. If the particular electronic and ionic insulating member is susceptible to corrosion by the electrolyte or is not completely impervious, thus permitting the electrolyte to seep through and corrode adjoining components, the surfaces of the member can be provided with a coating of a noble metal or a substance such as colloidal graphite in a solvent such as alcohol, to minimize such problems. This procedure is also effective in reducing leakage currents by better than a factor of 10.

Annular means or gasket 14 is preferably affixed to conducting member 12. Since electrode 13 is not a rigid mass but is to some extent flexible, the principal function of gasket 14 is to confine electrode 13 and prevent the mass of the electrode material from creeping out. The gasket material is preferably an insulator such as butyl rubber, although it need not necessarily be that. It should be flexible to accommodate expansion and contraction of the electrode. Other obvious ways of confining the electrode would be apparent to those skilled in the art.

Separator 15 is generally made of a highly porous material which functions as an electronic insulator between the electrodes yet affording free and unobstructed movement to the ions in the electrolyte. The pores of the separator 15 must be small enough to prevent carbon-to-carbon contact between the opposing electrodes, since such a condition would result in a short circuit and consequent rapid depletion of the charges accumulated on the electrodes. The separator can also be a nonporous ion-conducting material, such as ion exchange membranes. Any conventional battery separator should be suitable, and materials such as porous polyvinyl chloride, glass fiber filter paper, porous polypropylene, cellulose acetate and mixed esters of cellulose may be used. Prior to its use separator is generally saturated with electrolyte. This can be accomplished by soaking the separator in the electrolyte for about 15 minutes or less.

Carbon electrode 13 in accordance with the present invention comprise activated carbon having a polyoxometalate capable of multiple reverse redox reactions absorbed therein and an electrolyte held captive thereby. The activated carbon may be imbued with the electrolyte either before or after it is modified with the polyoxometalate compound. Likewise, the activated carbon may also be simultaneously exposed to both the electrolyte and the polyoxometalate compound, without suffering adverse charge storage characteristics to any of the components. The preferred method may vary with various polyoxometalates.

The electrolyte should consist of a highly conductive medium such as an aqueous solution of an acid, salt or base. Examples of suitable aqueous electrolytes are: ammonium chloride, sodium chloride, calcium chloride, potassium chloride, potassium carbonate, sulfuric acid, fluoroboric acid, sodium hydroxide, potassium hydroxide, etc. The pH of the solution must be chosen so that the polyoxometalate is stable as used. The pH may vary with various polyoxometalates.

The electrolyte in the electrode structure serves three functions: (1) as a promoter of ion conductivity, (2) as a source of ions, and (3) as a binder for the carbon particles. Sufficient electrolyte should be used to accomodate these functions. A separate binder can be used to perform the electrolyte's binder function, however, the separate binder would add an element of resistance which is undesirable.

The pressure applied to form the electrodes is dependent on many variables such as the dimensions of the electrode, particle size of the carbon material and particular electrolyte used. It should be limited to leave an amount of electrolyte within the electrode structure sufficient to accomplish its three functions referred to above.

A pair of electrodes thus produced are placed within a separate annular member 14 which is affixed to a circular plate 12. A separator membrane is interposed between the two electrodes and this capacitor cell is disposed on a lower platen of a press. The upper platen is brought down upon the cell until the surfaces make contact and a concentric ring is slipped over the cell. At this point, the capacitor cell is confined by the upper platen, the lower platen, and the concentric ring. The cell is then compressed at a pressure sufficient to render the cell a coherent structure. Pressure on the order of about 2,000 p.s.i. has been found sufficient.

EXAMPLES

The following example demonstrate the increased charge storage ability of activated carbon electrodes that have been modified with polyoxometalates.

EXAMPLE 1

The following example illustrates the subject invention by comparing the performance of a capacitor utilizing a polyoxometalate modified carbon electrode to a capacitor having a control carbon electrode.

The carbon used in the electrodes for this Example was an activated carbon commercially available from the Strem Chemical Company. This carbon had a BET surface area of about 1335 $m^2/g$ and a pore diameter (Å) to pore area ($m^2/g$) distribution about as follows: <20/904; 20–30/236; 30–40/97; 40–50/46; 50–60/14; 60–600/36.

The carbon was modified with the polyoxometalate, $H_4PMo_{11}VO_{40}$, in the following manner;

About 5.2 grams of $H_4P\ Mo_{11}VO_{40}$, prepared by the method of Tsigdinos and Hallada (Inorganic Chemistry, 1968, 7, 437–441), was dissolved in 25 weight percent $H_2SO_4$ to form a deep orange solution.

A carbon slurry was separately prepared by mixing about 20 g of the activated carbon with 25 weight percent $H_2SO_4$ until a clear $H_2SO_4$ solution layer was observed on settling of the carbon.

The carbon slurry was then stirred vigorously while the $H_4PMo_{11}\ VO_{40}$ solution was added. A blue color developed immediately signifying that some reduction of $H_4P\ Mo_{11}VO_{40}$ was taking place. The carbon was allowed to soak in this solution for two months with occasional stirring. The carbon was then isolated by decanting off the blue liquid phase, handpressed between sheets of adsorbant paper, and then further pressed between sheets of adsorbent paper in a die at about 6 tons RAM force. The carbon was then grated through a 20 mesh screen. This modified carbon material was then pressed into an electrode and assembled into a capacitor cell similar to that shown in FIG. 1. Unmodified carbon, in as-received condition, was also processed into an electrode in accordance with the above technique, with the exception that no polyoxometalate solution was incorporated into the carbon slurry, and assembled into a capacitor cell similar to the capacitor shown in FIG. 1.

The fabrication of the electrodes and capacitors were as follows; electrode pellets, each about 1.125" diameter by about 0.125" thick, and containing about 2.5 g of the polyoxometalate modified carbon or about 2.7 g of the unmodified control carbon were pressed from a die at 3 tons RAM force. The pellets were loaded into gaskets of butyl rubber. The gaskets were sealed on one face with a disk of conductive butyl rubber to serve as a current collector. This was affixed to the gasket with an adhesive. Each pellet was then uniformly wetted with about 0.2 ml of 25 weight percent $H_2SO_4$. A dry, porous polypropylene membrane was interposed between a pair of similar electrode assemblies to form a cell. The membrane was sealed to each butyl rubber gasket with adhesive. Each completed cell, similar to the cell shown in FIG. 1, was placed between brass contacts in a compression fixture at 3 tons RAM force. Electrical connections were provided between the cell and a power supply without regard to polarity since both half-cells were equivalent. However, polarity was always maintained the same in all tests with each cell.

Parameters characterizing the performance of two such cells, one utilizing polyoxometalate-modified activated carbon electrodes and one utilizing control unmodified activated carbon electrodes at a charging potential of 1.0 volt and an ambient temperature of approximately 20°–25° C. are listed in Table 1.

An explanation of the following headings, which appear in Tables 1-5 herebelow, is now presented:

(1) Cycle/days/total days—The first entry is the cycle number. All cycles are full charge (>95%)/deep discharge (>95%). The second entry is the number of days on charge for the measurements reported. The third entry is the total number of days on charge.

(2) ESR—Equivalent Series Resistance (milli-ohms).

(3) Capacitance—[Discharge time (sec)×discharge rate (A)]/[Charging voltage (V)×total carbon pellet weight (g)]. The quantity [charging voltage-equilibration voltage] can be used to more closely determine the actual amount of energy stored in the capacitor.

(4) Specific charge—[Discharge time (hr)×discharge rate (A)]/total carbon pellet weight (kg).

(5) Specific Energy—[Trapezoidal integration of the area under the discharge curve, in Volts×minutes, at one minute intervals]×discharge rate (A)/[total carbon pellet weight (kg)×60 min/hr].

Comparison of the date in Table 1 demonstrates about a 30% enhancement in the energy stored by the modified capacitor. There is little change in cell performances over several months of testing.

EXAMPLE 2

This example examines the performance of capacitor cells having polyoxometalate-modified activated carbon electrodes and control activated carbon electrodes at various charge voltages of from about 0.5 volt to about 1.3 volts.

Capacitor cells were fabricated in accordance with the methods taught in Example 1 above from the same carbon slurries and utilizing about 2.5 g $H_4P\ Mo_{11}VO_{40}$-modified carbon electrodes or about 2.6 g unmodified control carbon electrodes.

These cells were charged at various voltages between 0.5 and 1.3 volts. The results are presented in Table 2. The cell in accordance with the present invention displays steadily increasing percent energy storage with respect to the control cell with decreasing applied potentials. Although a negative energy enhancement is observed at 1.3 volts for the polyoxometalate-modified carbon electrode, this is not considered due to degradation of the polyoxometalate as evidenced by the good performance on returning to lower applied potentials. These results may indicate a reflection of the fact that the energy stored by double-layer charging will increase as the square of the applied voltage while the energy stored by the polyoxometalate is determined by the number of electrons required to reduce or oxidize the complex at a given voltage.

TABLE 1

Electrical Properties of Capacitors With/Without Polyoxometalate in Capacitor Electrodes

| CAPACITOR ELECTRODE | CYCLE/DAYS TOTAL DAYS | CHARGING VOLTAGE | ESR (m-Ω) | DISCHARGE TIME (min)/ DISCHARGE RATE (ma) | EQUILIBRATION VOLTAGE (20 min) | CAPACITANCE (farads/g) | SPECIFIC CHARGE (A-hr/kg) | SPECIFIC ENERGY (W-hr/kg) |
|---|---|---|---|---|---|---|---|---|
| UNMODIFIED | 0/0/0 | 1.00 | 47 | | | | | |
| CARBON | 1/3/3 | 1.00 | 46 | 16.66/100 | 0.10 | 18.5 | 5.14 | 2.19 |
| CONTROL | 2/4/7 | 1.00 | 47 | 16.85/100 | 0.10 | 18.7 | 5.20 | 2.20 |
| | 3/3/10 | 1.00 | 47 | 16.93/100 | 0.10 | 18.8 | 5.22 | 2.24 |
| | 69/3/18 | 1.00 | 49 | 17.02/100 | 0.11 | 18.9 | 5.25 | 2.27 |
| | 316/3/24 | 1.02 | 49 | 17.12/100 | 0.10 | 19.0 | 5.28 | — |
| | 1237/3/39 | 1.00 | 52 | 16.80/100 | 0.06 | 18.7 | 5.19 | 2.24 |
| | 1238/19/58 | 1.00 | — | 17.10/100 | 0.12 | 19.0 | 5.28 | 2.21 |
| | 1239/35/93 | 1.00 | 55 | 17.58/100 | 0.13 | 19.5 | 5.43 | 2.37 |
| | 1240/39/132 | 1.00 | 57 | 17.48/100 | 0.11 | 19.4 | 5.40 | 2.33 |
| | 1241/56/188 | 1.00 | 48 | 17.57/100 | 0.13 | 19.5 | 5.42 | 2.24 |
| POLYOXO- | 0/0/0 | | 34 | | | | | |
| METALATE | 1/3/3 | 1.00 | 35 | 26.17/100 | 0.06 | 31.4 | 8.72 | 3.43 |
| MODIFIED | 2/4/7 | 0.99 | 37 | 24.83/100 | 0.09 | 29.8 | 8.27 | 3.22 |
| CARBON | 3/3/10 | 1.01 | 35 | 24.75/100 | 0.09 | 29.7 | 8.25 | 3.21 |
| | 69/3/17 | 1.00 | 36 | 24.52/100 | 0.09 | 29.4 | 8.17 | 3.22 |
| | 332/3/24 | 1.00 | 34 | 22.90/100 | 0.09 | 27.5 | 7.63 | 3.03 |
| | 1247/3/42 | 1.00 | 34 | 21.63/100 | 0.03 | 26.0 | 7.21 | 2.98 |
| | 1248/34/76 | 1.00 | — | 23.83/100 | 0.08 | 28.6 | 7.94 | 3.09 |
| | 1249/35/111 | 1.00 | 34 | 24.20/100 | 0.09 | 29.1 | 8.07 | 2.97 |
| | 1250/39/150 | 1.00 | 32 | 24.28/100 | 0.10 | 29.0 | 8.06 | 2.93 |
| | 1251/56/206 | 1.00 | 22 | 24.73/100 | 0.10 | 29.7 | 8.24 | 3.08 |
| | 1362/49/255 | 1.00 | 35 | 20.78/100 | 0.06 | 24.9 | 6.93 | 2.68 |
| | 1363/3/258 | 1.00 | 21 | 23.7/100 | — | 28.4 | 7.90 | 2.90 |

TABLE 2

Electrical Properties of Capacitors With/Without Polyoxometalate in Capacitor Electrodes

| CAPACITOR ELECTRODE | CYCLE/DAYS TOTAL DAYS | CHARGING VOLTAGE | ESR (m-Ω) | DISCHARGE TIME (min)/ DISCHARGE RATE (ma) | EQUILIBRATION VOLTAGE (20 min) | CAPACITANCE (farads/g) | SPECIFIC CHARGE (A-hr/kg) | SPECIFIC ENERGY (W-hr/kg) |
|---|---|---|---|---|---|---|---|---|
| UNMODIFIED | 0/0/0 | | 46 | | | | | |
| CARBON | 1/3/3 | 1.00 | 46 | 33.98/50 | 0.07 | 19.6 | 5.45 | 2.40 |
| CONTROL | 2/4/7 | 1.00 | 46 | 34.18/50 | 0.07 | 19.7 | 5.48 | 2.40 |
| | 3/3/10 | 1.10 | 47 | 20.37/100 | 0.13 | 23.5 | 6.53 | 3.04 |
| | 4/4/14 | 1.20 | 51 | 24.77/100 | 0.15 | 28.6 | 7.94 | 3.87 |
| | 5/4/18 | 1.30 | 77 | 30.72/100 | 0.18 | 35.5 | 9.85 | 4.97 |
| | 6/3/21 | 1.00 | 73 | 18.10/100 | 0.13 | 20.9 | 5.80 | 2.44 |

TABLE 2-continued

Electrical Properties of Capacitors With/Without Polyoxometalate in Capacitor Electrodes

| CAPACITOR ELECTRODE | CYCLE/DAYS TOTAL DAYS | CHARGING VOLTAGE | ESR (m-Ω) | DISCHARGE TIME (min)/ DISCHARGE RATE (ma) | EQUILIBRATION VOLTAGE (20 min) | CAPACITANCE (farads/g) | SPECIFIC CHARGE (A-hr/kg) | SPECIFIC ENERGY (W-hr/kg) |
|---|---|---|---|---|---|---|---|---|
| | 7/3/24 | 0.46 | 59 | 5.13/100 | 0.09 | 5.9 | 1.64 | 0.33 |
| | 8/4/28 | 0.80 | 59 | 13.08/100 | 0.13 | 15.1 | 4.19 | 1.48 |
| POLYOXO- | 0/0/0 | | 48 | | | | | |
| METALATE | 1/3/3 | 1.00 | 45 | 52.68/50 | 0.04 | 31.6 | 8.78 | 3.49 |
| MODIFIED | 2/4/7 | 1.00 | 45 | 50.98/50 | 0.06 | 30.6 | 8.50 | 3.38 |
| CARBON | 3/3/10 | 1.10 | 45 | 27.63/100 | 0.10 | 33.2 | 9.21 | 3.85 |
| | 4/4/14 | 1.20 | 52 | 31.00/100 | 0.10 | 37.2 | 10.33 | 4.58 |
| | 5/4/18 | 1.30 | 133 | 28.60/100 | 0.27 | 34.3 | 9.53 | 4.00 |
| | 6/3/21 | 1.00 | 100 | 23.72/100 | 0.16 | 28.5 | 7.91 | 2.92 |
| | 7/3/24 | 0.50 | 53 | 8.23/100 | 0.13 | 9.9 | 2.74 | 0.69 |
| | 8/4/28 | 0.79 | 49 | 22.00/100 | 0.14 | 26.4 | 7.33 | 2.53 |

EXAMPLE 3

This Example demonstrates the ability of the polyoxometalate to increase the energy density of activated carbon electrodes fabricated from various carbon sources.

A carbon slurry was prepared from 15 g of activated carbon commercially available under the tradename "Witco 950" from the Witco Chemical Company and 25 weight percent $H_2SO_4$/0.2M HBr. This carbon had a BET surface area of about 1076 cm$^2$/g and a pore diameter (Angstroms) to pore area (m$^2$/g) distribution about as follows: <20/1033; 20–30/37; 30–40/2; 40–50/1; 50–60/0.4; 60–300/3.

About 4.0 g of $H_4P\,Mo_{11}VO_{40}$ was added while the carbon slurry was stirred. The carbon was soaked for about four days, then separated from the resultant blue solution and pressed into electrode pellets of about 2.6 g each. A capacitor cell was then fabricated as taught in Example 1.

A control capacitor cell was prepared identically except that the carbon electrodes in the control cell did not include the polyoxometalate $H_4P\,Mo_{11}VO_{40}$.

The performance characteristics of these two cells are presented in Table 3. As in Example 1, there is about a 30% increase in the energy stored by the capacitor using the polyoxometalate-modified activated carbon electrodes.

A second carbon slurry was prepared by mixing 85 g of activated carbon commercially available under the tradename "PWA" from the Calgon Carbon Corporation, as received, with 25 weight percent $H_2SO_4$ as in Example 1. This carbon had a BET surface area of about 1142 m$^2$/g and a pore diameter (Å) to pore area (m$^2$/g) distribution about as follows: <20/1059; 20-30/51; 30–40/11; 40–50/6; 50–60/3; 60–300/12. Twenty grams of $H_4PMo_{11}VO_{40}$ was added while the carbon slurry was stirred. The carbon was soaked for 10 days with occasional stirring, then separated from the resultant blue solution by filtration and pressed into electrode pellets of about 2.6 g each in the manner of Example 1. Two identical capacitors were fabricated from these electrodes after the manner of Example 1.

Two controls using unmodified activated carbon electrodes were prepared in identical fashion except that the polyoxometalate was omitted.

The characteristics of these capacitors are found in Table 3. There is about a 65% enhancement in the energy stored by the capacitors implementing the polyoxometalate-modified carbon electrodes as compared to the capacitors incorporating unmodified activated carbon electrodes.

Comparison of the performance characteristics of the capacitors in this Example and the performance characteristics of the capacitors in Example 1 indicates that polyoxometalates effectively increase the charge storage capacity of devices with any given activated carbon electrode, although the amount of charge stored by different activated carbon electrodes varies as a function of the carbon source.

TABLE 3

Electrical Properties of Capacitors With/Without Polyoxometalate in Capacitor Electrodes

| CAPACITOR ELECTRODE | CYCLE/DAYS TOTAL DAYS | CHARGING VOLTAGE | ESR (m-Ω) | DISCHARGE TIME (min)/ DISCHARGE RATE (ma) | EQUILIBRATION VOLTAGE (20 min) | CAPACITANCE (farads/g) | SPECIFIC CHARGE (A-hr/kg) | SPECIFIC ENERGY (W-hr/kg) |
|---|---|---|---|---|---|---|---|---|
| UNMODIFIED | 0/0/0 | | 34 | | | | | |
| CONTROL | 1/3/3 | 1.00 | 46 | 23.50/100 | 0.11 | 27.1 | 7.53 | 3.46 |
| CARBON | 2/2/5 | 1.00 | 47 | 22.97/100 | 0.14 | 26.5 | 7.36 | 3.39 |
| (WITCO 950) | 3/4/9 | 0.78 | — | 13.68/100 | 0.12 | 15.8 | 4.38 | 1.51 |
| $H_4PMo_{11}VO_{40}$ | 0/0/0 | | 240 | | | | | |
| MODIFIED | 1/5/5 | 1.00 | 272 | 36.63/100 | 0.15 | 42.3 | 11.74 | 4.52 |
| WITCO 950 | 2/4/9 | 0.80 | — | 26.27/100 | 0.15 | 30.3 | 8.42 | 2.74 |
| UNMODIFIED | 0/0/0 | | 17 | | | | | |
| CONTROL | 1/1/1 | 1.00 | 17 | 16.77/100 | 0.05 | 19.4 | 5.38 | 2.44 |
| CARBON | 2/4/5 | 1.00 | 17 | — | — | — | — | — |
| (PWA) | 0/0/0 | | 17 | | | | | |
| | 1/1/1 | 1.00 | 17 | 16.80/100 | 0.05 | 19.4 | 5.38 | 2.43 |
| | 2/4/5 | 1.00 | 17 | — | — | — | — | — |
| $H_4PMo_{11}VO_{40}$ | 0/0/0 | | 16 | | | | | |
| MODIFIED | 1/1/1 | 1.00 | 16 | 29.30/100 | 0.04 | 33.8 | 9.39 | 3.98 |
| PWA | 2/4/5 | 1.00 | 16 | — | — | — | — | — |
| CARBON | 0/0/0 | | 18 | | | | | |
| | 1/1/1 | 1.00 | 18 | 28.42/100 | 0.05 | 32.8 | 9.11 | 4.01 |

TABLE 3-continued

| | Electrical Properties of Capacitors With/Without Polyoxometalate in Capacitor Electrodes | | | | | | | |
|---|---|---|---|---|---|---|---|---|
| CAPACITOR ELECTRODE | CYCLE/DAYS TOTAL DAYS | CHARGING VOLTAGE | ESR (m-Ω) | DISCHARGE TIME (min)/ DISCHARGE RATE (ma) | EQUILI- BRATION VOLTAGE (20 min) | CAPACI- TANCE (farads/g) | SPECIFIC CHARGE (A-hr/kg) | SPECIFIC ENERGY (W-hr/kg) |
| | 2/4/5 | 1.00 | 19 | — | — | — | — | — |

EXAMPLE 4

This Example investigates the effectiveness of a polyoxometalate-modified carbon electrode in an energy storage device that utilizes an electrolyte other than $H_2SO_4$.

An aqueous electrolyte of about 100 g $K_2SO_4$/liter was prepared. A carbon slurry was prepared by mixing 20 g of the activated carbon used in Example 1, as received, with $K_2SO_4$ electrolyte until a clear $K_2SO_4$ layer was present on settling of the carbon. The pH was measured to be about 5. Fifteen grams of the polyoxometalate $H_4PMo_{11}VO_{40}$ was then added, resulting in a solution having a pH of about 2. Some of the protons of $H_4PMo_{11}VO_{40}$ are exchanged with potassium ions to form $K_xH_{4-x}PMo_{11}VO_{40}$ in this electrolyte, which precipitates as a fine dispersion distributed through the carbon matrix. The carbon was soaked for five days with occasional stirring, separated from the resultant light blue solution, and pressed into electrode pellets of about 2.6 g each. A capacitor cell was fabricated in the manner taught in Example 1. A control capacitor cell, containing unmodified carbon was also fabricated.

The performance characteristics of the capacitors made herein are shown in Table 4 below. As can be seen by examining the Specific Energy stored by each capacitor there is a 60% enhancement in the energy stored by the capacitor utilizing the polyoxometalate-modified activated carbon electrode, although the overall energy stored is less than that stored in a similar capacitor using $H_2SO_4$ electrolyte.

EXAMPLE 5

This Example illustrates the present invention by comparing the performance of a capacitor utilizing polyoxometalate. $H_5PMo_{10}V_2O_{40}$, modified activated carbon electrodes to a capacitor having unmodified activated carbon electrodes.

A carbon slurry was prepared by mixing 15 g of activated carbon Witco 950, from the Witco Chemical Company, as received, with 25 weight percent $H_2SO_4$ so that a clear $H_2SO_4$ solution layer was present on settling of the carbon. About 3.0 g of the polyoxometalate $H_5PMo_{10}V_2O_{40}$, prepared by the method of Tsigdinos and Hallada (Inorganic Chemistry, 1968, 7, 437–441) was added to the slurry with stirring. The carbon was allowed to soak for four days with occasional stirring, after which time the supernatant was a light blue.

A capacitor was fabricated in accordance with the method taught in Example 1, using this modified activated carbon as the electrode material. A control capacitor was also formed, incorporating unmodified activated carbon electrodes.

The capacitor cell performance characteristics of these cells are displayed in Table 5. Comparison of the data shows that the capacitor using an activated carbon electrode modified by the polyoxometalate has about a forty percent charge storage enhancement at about 1.0 volt.

TABLE 4

| | Electrical Properties of Capacitors With/Without Polyoxometalate in Capacitor Electrodes | | | | | | | |
|---|---|---|---|---|---|---|---|---|
| CAPACITOR ELECTRODE | CYCLE/DAYS TOTAL DAYS | CHARGING VOLTAGE | ESR (m-Ω) | DISCHARGE TIME (min)/ DISCHARGE RATE (ma) | EQUILI- BRATION VOLTAGE (20 min) | CAPACI- TANCE (farads/g) | SPECIFIC CHARGE (A-hr/kg) | SPECIFIC ENERGY (W-hr/kg) |
| UNMODIFIED CARBON CONTROL | 0/0/0 | | 102 | | | | | |
| | 1/3/3 | 1.00 | 176 | 6.40/100 | 0.18 | 7.4 | 2.05 | 0.85 |
| | 2/3/6 | 1.00 | 187 | 6.22/100 | 0.22 | 7.2 | 1.99 | 0.83 |
| | 3/10/16 | 1.03 | — | 6.33/100 | 0.20 | 7.3 | 2.03 | 0.88 |
| POLYOXO- METALATE MODIFIED CARBON | 0/0/0 | | 127 | | | | | |
| | 1/3/3 | 1.00 | 178 | 14.90/100 | 0.26 | 17.2 | 4.78 | 1.49 |
| | 2/3/6 | 1.00 | 270 | 13.18/100 | 0.27 | 15.2 | 4.22 | 1.38 |
| | 3/7/13 | 2.29 | — | — | — | — | — | — |

TABLE 5

| | Electrical Properties of Capacitors With/Without Polyoxometalate in Capacitor Electrodes | | | | | | | |
|---|---|---|---|---|---|---|---|---|
| CAPACITOR ELECTRODE | CYCLE/DAYS TOTAL DAYS | CHARGING VOLTAGE | ESR (m-Ω) | DISCHARGE TIME (min)/ DISCHARGE RATE (ma) | EQUILI- BRATION VOLTAGE (20 min) | CAPACI- TANCE (farads/g) | SPECIFIC CHARGE (A-hr/kg) | SPECIFIC ENERGY (W-hr/kg) |
| UNMODIFIED ACTIVATED CARBON CONTROL | 0/0/0 | | 52 | | | | | |
| | 1/3/3 | 1.00 | 80 | 19.50/100 | 0.15 | 22.5 | 6.25 | 2.67 |
| | 2/2/5 | 1.00 | 81 | 19.12/100 | 0.14 | 22.1 | 6.13 | 2.65 |
| | 3/4/9 | 0.80 | — | 13.40/100 | 0.13 | 15.4 | 4.29 | 1.50 |
| $H_5PMo_{10}V_2O_{40}$ MODIFIED ACTIVATED CARBON | 0/0/0 | | 35 | | | | | |
| | 1/3/3 | 1.00 | 45 | 30.40/100 | 0.15 | 35.1 | 9.74 | 3.82 |
| | 2/2/5 | 1.00 | 46 | 28.82/100 | 0.13 | 33.3 | 9.24 | 3.69 |
| | 3/4/9 | 0.80 | — | 22.93/100 | 0.13 | 26.5 | 7.35 | 2.55 |

EXAMPLE 6

This example illustrates the present invention by comparing the performance of a capacitor utilizing the polyoxometalate $(NH_4)_6P_2Mo_{18}O_{62}$ in modified activated carbon electrodes to a capacitor having unmodified activated carbon electrodes.

A carbon slurry was prepared by mixing 10 g of Witco 950, from the Witco Chemical Company, as received, with 25 weight percent $H_2SO_4$ so that a clear $H_2SO_4$ solution layer was present on settling of the carbon. About 2.1 g of the polyoxometalate $(NH_4)_6P_2Mo_{18}O_{62}$, prepared by the method of Tsigdinos (Ph.D. Thesis, Boston University, 1961, p. 106), was added to the slurry with stirring. The carbon was allowed to soak for about 10 days with occassional stirring, after which time the supernatant was blue.

A capacitor was fabricated in accordance with the method taught in Example 1, using this modified activated carbon as the electrode material. A control capacitor was also formed incorporating unmodified Witco 950 activated carbon electrodes.

The capacitor performance characteristics of these cells are displayed in Table 6. There is about a 56% enhancement in the Specific Energy of the capacitor having electrodes in accordance with the present invention, as compared to unmodified activated carbon control electrodes.

TABLE 6

| | Electrical Properties of Capacitors With/Without Polyoxometalate in Capacitor Electrodes | | | | | | | |
|---|---|---|---|---|---|---|---|---|
| CAPACITOR ELECTRODE | CYCLE/DAYS TOTAL DAYS | CHARGING VOLTAGE | ESR (m-Ω) | DISCHARGE TIME (min)/ DISCHARGE Rate (ma) | EQUILI- BRATION VOLTAGE (5 min) | CAPACI- TANCE (farads/g) | SPECIFIC CHARGE (A-hr/kg) | SPECIFIC ENERGY (W-hr/kg) |
| UNMODIFIED ACTIVATED CARBON ELECTRODES | 0/0/0 | 1.00 | 52 | 19.5/100 | 0.15 | 22.5 | 6.25 | 2.67 |
| $(NH_4)_6P_2Mo_{18}O_{62}$— MODIFIED ACTIVATED CARBON ELECTRODES | 0/0/0 | 1.00 | 55 | 32.1/100 | 0.10 | 37.0 | 10.2 | 4.16 |

It is to be understood that the foregoing examples have been provided to enable those skilled in the art to have representative examples by which to evaluate the invention and that these examples should not be construed as any limitation on the scope of this invention. Inasmuch as the composition of the modified activated carbon electrodes employed in the present invention can be varied within the scope of the total specification disclosure, neither the particular polyoxometalate or activated carbon components, nor the relative amounts of the components in the electrodes exemplified herein shall be construed as limitations of the invention.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

We claim:

1. An improved carbon-based electrode comprising an activated carbon electrode having absorbed throughout the electrode structure a polyoxometalate compound represented by the formula $$A_a[L_lM_mJ_zO_y]$$

wherein
- A is at least one ion selected from the group consisting of hydrogen, the Group I-A to VIII-A or I-B to VII-B elements, the rare earths or actinides, ammonium, alkyl ammonium, alkyl phosphonium and alkyl arsonium;
- L is at least one element selected from the group consisting of hydrogen and Group III-B to VII-B elements;
- M is at least one metal selected from the group consisting of Group I-A to IV-A metals, Group VII-A to II-B metals, the rare earths and actinides; and
- J is at least one metal selected from the group consisting of Group V-A and Group VI-A metals; and wherein
- a is a number which when multiplied by the valence of A will balance the charge on the polyoxometalate complex within the brackets;
- l is a number ranging from zero to about 20;
- m is a number ranging from zero to about 20;
- z is a number ranging from about 1 to about 50; and
- y is a number ranging from about 7 to about 150.

2. The electrode in accordance with claim 1 wherein L is at least one element of the group consisting of P, As, Si, Al, H, Ge, Ga and B; M is at least one element of the group Zn, Ti, Mn, Fe, Co, Ni, Rh, Zr and Re; and J is at least one metal of the group consisting of Mo, W and V; and wherein l ranges from zero to about 4; m ranges from zero to about 6; z ranges from about 6 to about 24; and y ranges from about 18 to about 80.

3. The electrode in accordance with claim 1 wherein said polyoxometalate is a hexametalate.

4. The electrode in accordance with claim 1 wherein said polyoxometalate is a Keggin anion.

5. The electrode in accordance with claim 4 wherein said polyoxometalate is $H_4[PVMo_{11}O_{40}]$ which contains a Keggin anion.

6. The electrode in accordance with claim 4 wherein said polyoxometalate is $H_5[PV_2Mo_{10}O_{40}]$ which contains a Keggin anion.

7. The electrode in accordance with claim 6 wherein said polyoxometalate is $(NH_4)_6[P_2Mo_{18}O_{62}]$ which contains a Dawson anion.

8. The electrode in accordance with claim 1 wherein said polyoxometalate is a Dawson anion.

9. The electrode in accordance with claim 1 wherein said activated carbon has a BET surface area of from about 100 m²/g to about 2000 m²/g.

10. The electrode in accordance with claim 1 wherein said activated carbon has a BET surface area of from about 500 m²/g to about 1500 m²/g.

11. The electrode in accordance with claim 1 wherein said polyoxometalate is absorbed by said activated carbon up to about forty weight percent, based on the total weight of said improved electrode.

12. The electrode in accordance with claim 1 wherein said polyoxometalate is absorbed by said activated carbon from about five weight percent to about twenty-five weight percent, based on the total weight of said improved electrode.

13. An energy storage device comprising a pair of electrodes electrically isolated from each other, an electrolyte in contact with the electrodes, and means for collecting electrical current therefrom; at least one electrode comprising an activated carbon electrode having a polyoxometalate compound absorbed therein.

14. The energy storage device in accordance with claim 13 wherein said polyoxometalate compound is represented by the formula:

$$A_a[L_lM_mJ_zO_y]$$

wherein
A is at least one ion selected from the group consisting of hydrogen, the Group I-A to VIII-A or I-B to VII-B elements, the rare earths and actinides, ammonium, alkyl ammonium, alkyl phosphonium and alkyl arsonium;
L is at least one element selected from the group consisting of hydrogen and Group III-B to VII-B elements;
M is at least one metal selected from the group consisting of Group I-A to IV-A metals, Group VII-A to II-B metals, the rare earths and actinides; and
J is at least one metal selected from the group consisting of Group V-A metals and Group VI-A metals; and
wherein
a is a number which when multiplied by the valence of A will balance the charge on the polyoxometalate complex within the brackets;
l is a number ranging from zero to about 20;
m is a number ranging from zero to about 20;
z is a number ranging from about 1 to about 50; and
y is a number ranging from about 7 to about 150.

15. The energy storage device in accordance with claim 11 wherein L is at least one element of the group consisting of P, As, Si, Al, H, Ge, Ga and B; M is at least one element of the group Zn, Ti, Mn, Fe, Co, Ni, Rh, Zr and Re; and J is at least one metal of the group consisting of Mo, W and V; and wherein l ranges from zero to about 4; m ranges from zero to about 6; z ranges from about 6 to about 24; and y ranges from about 24 to about 80.

16. The energy storage device in accordance with claim 13 wherein said polyoxometalate is a hexametalate.

17. The energy storage device in accordance with claim 13 wherein said polyoxometalate is a Keggin anion.

18. The energy storage device in accordance with claim 13 wherein said polyoxometalate is a Dawson anion.

19. The energy storage device in accordance with claim 13 wherein said polyoxometalate is absorbed by said activated carbon up to about forty weight percent, based on the total weight of said improved electrode.

20. An electric double layer capacitor comprising a housing, at least one pair of spaced activated carbon electrodes in the housing, an electrolyte in contact with said electrodes, and an ionically conductive separator interposed between said electrodes and in contact therewith, the electrodes comprising activated carbon having a polyoxometalate compound absorbed therein.

21. The capacitor in accordance with claim 20 wherein said polyoxometalate compound is represented by the formula:

$$A_a[L_lM_mJ_zO_y]$$

wherein
A is at least one ion selected from the group consisting of hydrogen, the Group I-A to VIII-A or I-B to VII-B elements, the rare earths and actinides, ammonium, alkyl ammonium, alkyl phosphonium and alkyl arsonium;
L is at least one element selected from the group consisting of hydrogen and Group III-B to VII-B elements;
M is at least one metal selected from the group consisting of Group I-A to IV-A metals, Group VII-A to II-B metals, the rare earths and actinides; and
J is at least one metal selected from the group consisting of Group V-A metals and Group VI-A metals; and
wherein
a is a number which when multiplied by the valence of A will balance the charge on the polyoxometalate complex within the brackets;
l is a number ranging from zero to about 20;
m is a number ranging from zero to about 20;
z is a number ranging from about 1 to about 50; and
y is a number ranging from about 7 to about 150.

22. The capacitor in accordance with claim 21 wherein L is at least one element of the group consisting of P, As, Si, Al, H, Ge, Ga and B; M is at least one element of the group consisting of Zn, Ti, Mn, Fe, Co, Ni, Rh, Zr and Re; and J is at least one metal of the group consisting of Mo, W and V; and wherein l ranges from zero to about 4; m ranges from zero to about 6; z ranges from about 6 to about 24; and y ranges from about 18 to about 80.

23. The capacitor in accordance with claim 20 wherein said polyoxometalate is a hexametalate.

24. The capacitor in accordance with claim 20 wherein said polyoxometalate is a Keggin anion.

25. The capacitor in accordance with claim 20 wherein said polyoxometalate is a Dawson anion.

* * * * *